UNITED STATES PATENT OFFICE.

ADAM GIGRICH, OF AMITYVILLE, NEW YORK.

IMPROVEMENT IN JAPAN COMPOSITION.

Specification forming part of Letters Patent No. 176,856, dated May 2, 1876; application filed April 13, 1876.

*To all whom it may concern:*

Be it known that I, ADAM GIGRICH, of Amityville, in the county of Suffolk and State of New York, have invented certain new and useful Improvements in White Baking-Japan; and I do hereby declare that the following is a full, clear, and exact description thereof, which will enable others skilled in the art to which it appertains to make and use the same.

This invention relates to a mixture for coating wooden-ware, &c., with an insoluble covering resembling glass or china, said mixture being manufactured in the manner hereinafter more fully shown and described.

I take of baking-japan, of the lightest color possible, one-half gallon, more or less, and mix this with a varnish made of gum and turpentine, in sufficient quantity to make a gallon of what I call the "first solution;" I then take three pounds of Cremnitz white and grind this dry, together with a small quantity of Prussian blue. When this has been ground together to a fine powder, I mix it with part of the one gallon of first solution, and grind all together for a considerable length of time, so as to thoroughly intermix the particles. I then add the rest of the one gallon of first solution. By this operation is produced what I call the "second solution." I then mix three-fourths of a gallon of this second solution with one-fourth of a gallon of the first solution, the object of this being simply to thin it down. The gallon of third solution thus produced I boil thoroughly, and then filter through a flannel, felt, or other bag. The solution thus produced is a thick fluid of whitish color, this being my so-called white baking-japan.

The manner of using this solution is similar to that of black baking-japan—that is, the article to be coated is either immersed in the solution, or the latter is applied to it by means of a brush, the first method, however, being preferably. When applied, the solution should be slightly warmed, while the article to be coated should be cold, as it will then stick better. Having been coated the article is kept in a comfortably warm room for a short space of time, and is then placed in a baking oven, where it is baked at a heat of from 250° to 350°. The length of time required for baking it depends upon the heat, but on an average two to four hours is sufficient. Having been thus baked, the article is removed from the oven, having a coat which in appearance much resembles china, and giving it all the advantages of a china dish, while, of course, being made of wood, it is not so easily broken.

Having thus described my invention, I claim and desire to secure by Letters Patent of the United States—

The white japan for wooden and other wares herein described, composed of ordinary baking-japan, varnish, Cremnitz white, and Prussian blue, all mixed in about the proportions hereinbefore set forth.

In testimony that I claim the foregoing as my own I have affixed my signature in presence of two witnesses.

ADAM GIGRICH.

Witnesses:
WM. BAGGER,
C. A. SNOW.